United States Patent
Sato

[19]

[11] Patent Number: 6,131,457
[45] Date of Patent: Oct. 17, 2000

[54] ACCELERATION SENSOR

[75] Inventor: Kaoru Sato, Kumamoto, Japan

[73] Assignee: Matsushita Electric Industrial Co., Ltd., Osaka, Japan

[21] Appl. No.: 09/287,156

[22] Filed: Apr. 6, 1999

[30] Foreign Application Priority Data

Mar. 19, 1999 [JP] Japan .................................... 11-75676

[51] Int. Cl.[7] .................................................. G01P 15/00
[52] U.S. Cl. ...................................................... 73/514.31
[58] Field of Search ............................ 73/514.31, 514.16, 73/514.01, 514.35; 324/207.13

[56] References Cited

FOREIGN PATENT DOCUMENTS 5-142246   6/1993   Japan .

Primary Examiner—Richard A. Moller
Attorney, Agent, or Firm—Ratner & Prestia

[57] ABSTRACT

A three-dimensional acceleration sensor having a magnetic body including a mass point, mounted to a vibrator having three-dimensional freedom and an axis in line with a Z-axis within the orthogonal spatial coordinate axes of X, Y and Z. The acceleration sensor includes four or more detector elements including at least two positioned along the X-axis and at least two positioned along the Y-axis with their centers located along a concentric circle around the origin point of the coordinate axes. The sensor detects acceleration in a direction of the X-axis through a relative difference in output voltage between two of the detector elements positioned along the X-axis due to a variation of magnetic field intensity from the magnetic body, acceleration in a direction of the Y-axis through a relative difference in output voltage between two of the detector elements positioned along the Y-axis, and acceleration in a direction of the Z-axis through an aggregate sum of the output voltages of all the detector elements. The acceleration sensor thus has a wide dynamic range as well as high detection accuracy, and may be produced having a reduced size.

14 Claims, 13 Drawing Sheets

ACCELERATION SENSOR

FIELD OF THE INVENTION

The present invention relates to an acceleration sensor adaptable for use in controlling orientation, position, etc. of various moving bodies by detecting their displacements, in the fields of exchangeable tools to be fastened as an attachment tool at an end of a robotic arm and a variety of manipulators, or in a car navigation systems and the like. More particularly, the present invention relates to an acceleration sensor capable of performing three-dimensional measurements by detecting acceleration in vector of a displacement of a three-dimensional moving body.

BACKGROUND OF THE INVENTION

Robotic machinery provided with an automatic tool exchanging apparatus, for example, is detachably fastened with an automatically exchangeable tool at an end of the manipulating hand, and an acceleration sensor is mounted on the same end of the hand for detecting a motion of the hand. With the advancement of intelligent apparatuses in other fields, acceleration sensors of the same kind are also utilized for detecting the motion of subjects being controlled.

The acceleration sensors are provided with vibration units that vibrate integrally with the motion of the subjects being controlled or detected. As methods of detecting vibration of the vibration units, the acceleration sensors of electromagnetic induction type, electrostatic capacitance type, or of a type utilizing a piezoelectric element, etc. have been generally known to date.

The electromagnetic induction type comprises a magnetic body connected to a vibration unit, and a coil positioned in the magnetic flux that varies by a displacement of the magnetic body, so as to measure acceleration through a voltage output generated across the coil. The electrostatic capacitance type comprises a pair of electrodes arranged to form a capacitive space between a vibration unit side and an absolute stationary side, so as to detect acceleration through a variation of capacitance due to a change of the space gap between the electrodes, when the vibration unit side electrode displaces with respect to the absolute stationary side. The sensor type which uses a piezoelectric element, includes the piezoelectric element mounted on a part of the vibration unit side, which is subject to distortion caused by vibration of a load, and detects acceleration through variation of an output of the piezoelectric element due to the distortion of the vibration unit.

Any acceleration sensor of the above types is considered to have a function suitable for a system that detects acceleration in a moving unit of single-axis. With respect to the acceleration sensors of the electrostatic capacitance type and the piezoelectric element type, a reduction in overall sensor size has been achieved as a result of advances in semiconductor and thin film manufacturing technologies. This allows for production of the electrodes and even the piezoelectric elements in thin-form, including a casing of the acceleration sensor as well as a mass point (mass unit) on the vibration unit provided in it. Also, in a field of the acceleration sensors of electromotive type which utilize the electromagnetic induction method, advances in technology have enabled thin-film permanent magnets of reduced size to be produced by an epitaxial growth process in combination with a flat-shape coil, as disclosed in Japanese Patent Laid-Open Publication No. H05-142246.

On the other hand, the acceleration sensors are required to be capable of detecting a displacement in three dimensions: not only one axis, but along three axes, X, Y and Z of the orthogonal spatial coordinates, as an indispensable condition for controlling robotic hands and the like. Detection of a three-dimensional displacement of this nature can be attained by combining three acceleration sensors of single-axis, one for each direction of the X-, Y- and Z-axes, for instance. Such combination had been the mainstream technology in the past. Especially for those of the electromagnetic induction type, it is structurally quite impracticable to design an acceleration sensor of dual-axis or triple-axis types, since each of the acceleration sensors contains coils. Hence, acceleration sensors of the foregoing single-axis structure are utilized by combining them to sense displacement in three dimensions.

If at least three sets of the ordinary acceleration sensor of single-axis type are combined, however, the overall size of the structure simply becomes a size that is nearly three times as large as the size of a single acceleration sensor of single-axis type. Therefore, if the subject being detected is small in size and light in weight, an increase in both weight and size (i.e. volume) due to the addition of the three acceleration sensors, can result in a considerable and undesirable effect. Therefore, simply combining three individual acceleration sensors may not be adaptable to apparatus in the fields where reduction in size is of primary importance.

On the contrary, there still remains a possibility of adapting acceleration sensors of the electrostatic capacitance type and the piezoelectric element type to the three-axis application, since they can be reduced in size by taking advantage of the semiconductor and thin film manufacturing technology, as described above. In the case of the electrostatic capacitance type, for example, it has been known that there is a structure adaptable for the three axes, X, Y and Z. In that known structure, each of the electrodes on the vibration unit side and the stationary side are split into four regions within a plane that includes the electrodes, and a variation of capacitance corresponding to each of the axes is then detected by using a combination of individual displacements of the electrodes in these split regions. Similarly, the piezoelectric element type can also be expected to be produced at a reduced size to a certain extent, due to advances in semiconductor and thin film manufacturing technology.

An acceleration sensor of the electrostatic capacitance type detects a displacement of the subject being controlled by utilizing a variation of capacitance due to a change in distance of the space gap formed between a pair of the electrodes: one on the vibration unit side and, and one on the absolute stationary side. It is therefore desirable to narrow the gap between the electrodes in order to detect the change in capacitance. Accordingly, the maximum magnitude of displacement of the electrode on the vibration unit side is restricted within this space gap. For the above reason, a range of the measurable acceleration (hereinafter referred to as "dynamic range") for the acceleration sensor of electrostatic capacitance type is relatively small. Since the maximum amplitude for the vibration unit also needs to be designed small, a range of the detectable acceleration is limited.

In the case of the piezoelectric element type, it is unavoidable that an adverse effect to the detecting characteristic is experienced due to a pyroelectric effect of the piezoelectric element caused by changes of the external temperature. In order to stabilize the detecting characteristic, it is therefore necessary to make a temperature compensation, which complicates the apparatus and its control, due to the inclusion of additional controls for the temperature compensation. It also has a relatively small dynamic range, as in the case of the electrostatic capacitance type, since a movable range of the vibration unit is limited to a magnitude which will not break the piezoelectric element fixed to a cantilever.

As described, the acceleration sensors utilizing the electrostatic capacitance type and the piezoelectric element type include shortcomings which restrict their general versatility due to a limitation of the adaptable fields, since their dynamic ranges are small, although a reduction in the size of these sensors is possible.

On the other hand, electromagnetic induction type-acceleration sensors can be adapted for wide range of acceleration-sensing applications by providing a sufficient magnitude of displacement for the magnetic body to move about with respect to the coil. This increases the dynamic range so that it is substantially greater than that of the electrostatic capacitance type-acceleration sensors and the piezoelectric element type-acceleration sensors. Since this does not restrict the magnitude of vibrating amplification, these sensors are adaptable for positional detection of a minute displacement of an element, e.g. in a compact precision machine, as well as a large robotic hand, for example, thereby providing for a broad versatility.

The majority of electromagnetic induction type-acceleration sensors are adaptable only for the single-axis use. Effective means for adapting these sensors for triple-axis (three dimensional) use have not yet been proposed or established. One of the reasons for this limitation is that the disposition of at least three coils for the three axes prevents the necessary size reduction. While providing multiple coils for the three axes increases the size and bulk of the acceleration sensors, it is an indispensable condition to dispose the coils in a manner that magnetic flux through them varies with motion of the magnetic body.

Although electromagnetic induction-type acceleration sensors having wide dynamic ranges can be used effectively in a wide variety of the fields and can be used to detect almost all subjects, they are not adaptable for the triple-axis use as means for making three-dimensional measurements using convention technology.

An object of the present invention is to provide an acceleration sensor which is capable of sensing in three-dimensions and which has a wide dynamic range that is capable of detecting a three-dimensional movement and a magnitude of displacement of a subject being controlled with high accuracy and high sensitivity, and which is also of reduced size.

SUMMARY OF THE INVENTION

An acceleration sensor of the present invention comprises (1) a substrate, (2) a vibrator connected to the substrate as a vibration unit having three-dimensional freedom, (3) a magnetic body mounted on the vibrator, and (4) at least four detector elements for detecting a variation of magnetic field caused by a displacement of the magnetic body. The acceleration sensor thus detects each of (a) acceleration in a direction of the X-axis in the orthogonal spatial coordinate axes of X, Y and Z based on output signals of at least two of the detector elements due to variation of the magnetic field, (b) acceleration in a direction of the Y-axis based on output signals of at least two other of the detector elements due to variation of the magnetic field, and (c) acceleration in a direction of the Z-axis based on output signals of all of the detector elements.

Also, an acceleration sensor of the present invention comprises (1) a vibrator connected to a substrate as a vibration unit having three-dimensional freedom, (2) a magnetic body having a mass point, mounted on the vibrator with its axis in line with the Z-axis within the orthogonal spatial coordinate axes of X, Y and Z, and displaceable by an external acceleration, and (3) at lease four detector elements positioned at least on the X-axis and Y-axis with their centers located along a perimeter of a concentric circle around the origin point of the orthogonal spatial coordinate axes for detecting a variation of magnetic field caused by a displacement of the magnetic body. The acceleration sensor is thus capable of detecting each of (a) acceleration in the direction of X-axis through a relative difference in output voltage between the two detector elements on the X-axis due to a variation of the magnetic field, (b) acceleration in the direction of Y-axis through a relative difference in output voltage between the two detector elements on the Y-axis due to a variation of the magnetic field, and (c) acceleration in the direction of Z-axis through a sum total of the output voltages of all the detector elements.

By disposing all of the detector elements on the same plane, a three-dimensional acceleration sensor having a great dynamic range can be constituted while also attaining a substantial reduction in size as compared to a structure that combines three units of the single-axis type. As such, the three-dimensional acceleration sensor provides improved versatility.

The acceleration sensor of the present invention further comprises a plurality of pairs of detector elements arranged symmetrically to each other with respect to the origin point of the orthogonal spatial coordinate axes in a manner that any two adjoining elements do not interfere with each other, or the detector elements on the X-axis and the Y-axis. Hence, the acceleration sensor is capable of detecting acceleration in a direction of the symmetry about the origin point through a relative difference in output voltage between the pair of detector elements having a positional relation of the symmetry due to a variation of the magnetic field. Accordingly, the acceleration sensor is capable of detecting acceleration in at least three directions in the X-Y plane, instead of only along the X-axis and Y-axis.

In another exemplary embodiment, the acceleration sensor of the present invention is provided with coils for the detector elements, so as to produce a voltage output by electromagnetic induction.

In another exemplary embodiment, an acceleration sensor of the present invention also includes a lower magnetic layer disposed beneath the coil and capable of attracting and collecting the magnetic flux from the magnetic body, and guiding the magnetic flux toward a direction that traverses an approximate center of the coil. The lower magnetic layer can increase the output voltage induced in the detector element by concentrating the magnetic flux towards the center of the detector element, so as to improve the accuracy of detecting acceleration.

The acceleration sensor of the present invention may, in another exemplary embodiment, be provided with an MR element for the detector element, so as to obtain a voltage output by the magnetoresistance effect.

The present invention also provides an acceleration sensor disposed at a side of the MR element facing toward the magnetic body with a magnetic concentration layer capable of attracting and concentrating the magnetic flux of the magnetic body, and guiding the magnetic flux toward a direction that traverses the MR element. The magnetic concentration layer can increase the output voltage obtained from the MR element by concentrating the magnetic flux toward the MR element, so as to improve the accuracy of detecting acceleration.

In yet another exemplary embodiment, an acceleration sensor of the present invention may further comprise (1) a lower layer substrate forming the detector elements on its surface, (2) an intermediate layer substrate overlaid on top of the lower layer substrate, provided with a hollow space having a capacity to include the detector elements, and a barrier plate functioning as the vibrator and positioned along an upper portion of the hollow space, and (3) an upper layer substrate overlaid on top of the intermediate layer substrate, and having a recessed cavity at an area facing toward the vibrator. Each of these substrates, the detector elements, the magnetic body and the lower magnetic layer are formed by semiconductor and thin film manufacturing processes. Even though the acceleration sensor includes laminated structures on the substrates, it still offers the advantage of reduced thickness in a direction of the layered films, since the detector elements are contained within the same plane, In another exemplary embodiment, the acceleration sensor of the present invention substitutes a coil positioned in the same plane and to surrounding all of the detector elements. An alternate current is then externally flowed through the coil, so as to generate signals of the same frequency in all the detector elements. If the magnetic body of the above structure receives an external force, a displacement of the magnetic body produces a relative difference in output voltage between the detector elements facing against each other in each of the X- and Y-axes direction, thereby enabling detection of the acceleration in the same manner.

BRIEF DESCRIPTION OF THE DRAWINGS

FIG. 6 is composed of a material of high magnetic permeability, and an alternating current is produced in a coil wound around the detector elements;

DESCRIPTION OF THE PREFERRED EMBODIMENTS

First Exemplary Embodiment

An acceleration sensor of a first exemplary embodiment of the present invention is described by referring to FIG. 1 to FIG. 4B.

Figure 1:
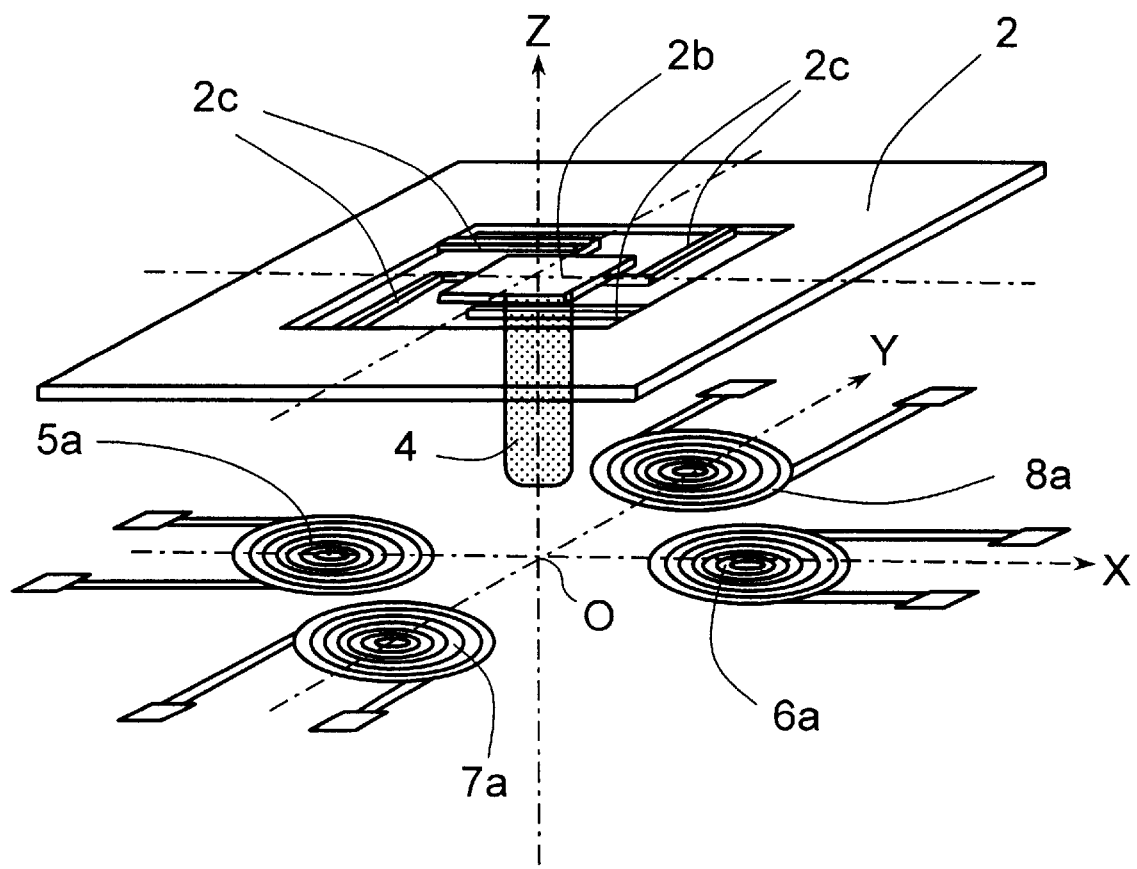
FIG. 1 is a schematic view showing an essential portion of an acceleration sensor of the first exemplary embodiment of the present invention, in which the detector elements comprise coils.
Figure 2:
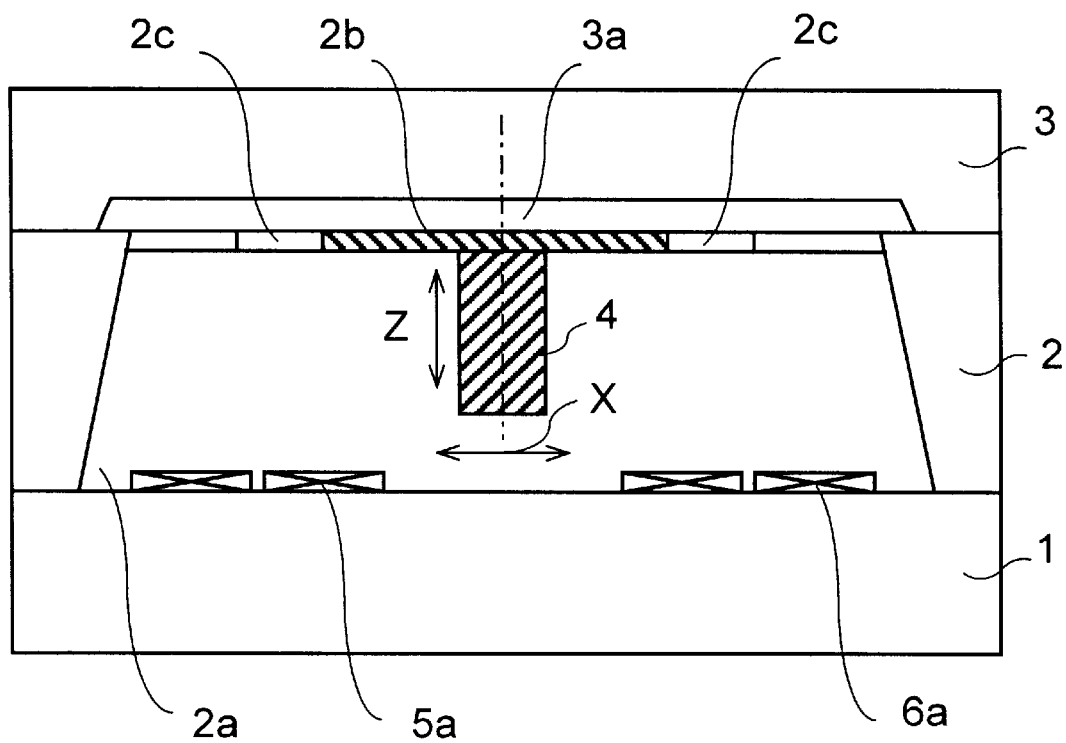
FIG. 2 is a longitudinal cross-sectional view showing an essential portion of the acceleration sensor of the first exemplary embodiment of the present invention in which the detector elements comprise coils.

FIG. 1 is a schematic view showing an essential portion of the acceleration sensor of the present invention, and FIG. 2 is a longitudinal sectional view showing the same portion.

As shown in the longitudinal sectional view of FIG. 2, the acceleration sensor has a multi-layered structure comprising a lower layer substrate 1, an intermediate layer substrate 2, and an upper layer substrate 3. Substrates 1 to 3 are formed by using semiconductor and thin film manufacturing technology, as mentioned in the background of the invention. Here the semiconductor and thin film manufacturing technology is well-known technology called microfabrication technology for fabricating integrated circuits, thin film magnetic heads, and micro magnetic devices, and integrated micromotion systems. The semiconductor and thin film manufacturing technology contains microfabrication technology including thin film deposition, photolithography, and etching. Evaporation methods, sputtering methods, chemical vapor deposition (CVD) methods, electroplating methods, and so on are well known thin film deposition technologies. Bulk materials like silicon single crystal wafers or the thin films deposited using these methods are patterned using photolithography and etching. Ion-milling methods and chemical etching methods are well known etching technologies.

The intermediate layer substrate 2 has a hollow space 2a formed in its interior, and the upper layer substrate 3 is formed with a recessed cavity 3a disposed above and corresponding to the hollow space 2a as shown in the longitudinal cross-section of FIG. 2. Also, a vibrator 2b formed of a thin film plate is formed on an upper side of the intermediate layer substrate 2, at a location where hollow space 2a is conterminous to the cavity 3a. The vibrator 2b is shaped square and flat, as shown in FIG. 1, and it is connected to the upper side of the intermediate layer substrate 2 by preferably L-shaped flat stays 2c at the mid part of each side of the flat periphery of vibrator 2b as seen in FIG. 1.

In other words, the periphery of the vibrator 2b is separated from the upper surface of the intermediate layer substrate 2, and supported by the four stays 2c, which are easily deformable and have elasticity to allow for twisting and bending. Hence, the vibrator 2b is free for vibrations including three-dimensional twisting, because of the manner in which vibrator 2b is connected by L-shaped stays 2c to intermediate layer substrate 2.

A permanent magnet is provided on an underside of the vibrator 2b as a magnetic body 4. This permanent magnet 4 is either formed by the semiconductor and thin film manufacturing technology in the same way as the substrates 1 to 3, or by fixing a minute size magnet to the vibrator 2b with adhesive means or the like. In the case of utilizing the semiconductor and thin film manufacturing technology, for example, magnetic material is deposited on the underside of the vibrator 2b by a plating method or a vapor deposition method after the vibrator 2b is formed, and it is magnetized in an intense magnetic field to form the permanent magnet 4. The permanent magnet 4 shall be such that it has a mass sufficient to deform the vibrator 2b by the force of inertia, when the acceleration sensor displaces.

A total of four detector elements 5a, 6a, 7a and 8a are formed in layered films on the surface of the lower layer substrate 1 in the same manner by semiconductor and thin film manufacturing technologies. These detector elements 5a to 8a function as coils, and are able to generate output voltages in proportion to a rate of change of magnetic flux, which interlinks each of the detector elements, with respect to time, as the magnetic field varies due to displacement of the permanent magnet 4, when the vibrator 2b vibrates three-dimensionally.

The vibrator 2b, the permanent magnet 4 and the individual detector elements 5a to 8a are arranged in the positional relation contained within the orthogonal spatial coordinates X, Y and Z as shown in FIG. 1, in order for the four detector elements 5a to 8a to detect a three-dimensional displacement of the permanent magnet 4.

That is, in FIG. 1, the orthogonal coordinates of X- and Y-axes including the origin point O are established on a surface of the lower layer substrate 1, where the detector elements 5a to 8a are formed, and Z-axis passing through the origin point O is established. Then, a center of the vibrator 2b and an axis of the cylindrically formed permanent magnet 4 are positioned on the Z-axis. Detector elements 5a and 6a are positioned along the X-axis, and detector elements 7a and 8a along the Y-axis. In addition, these detector elements 5a to 8a are concentrically positioned in a manner that their centers are disposed along the perimeter of a circle drawn on the X-Y plane around the origin point O.

When the cylindrically shaped permanent magnet 4 is in its relaxed position (a stationary position when vibration is not given) according to the foregoing arrangement of the detector elements 5a to 8a, distances measured from a lower end of the permanent magnet 4 along the Z-axis to each of the detector elements 5a to 8a are equal. In the plane as viewed from the Z-axis direction, distances in the directions of X-axis and Y-axis from the origin point O to the center of the individual detector elements 5a to 8a are also equal.

Figure 3A:
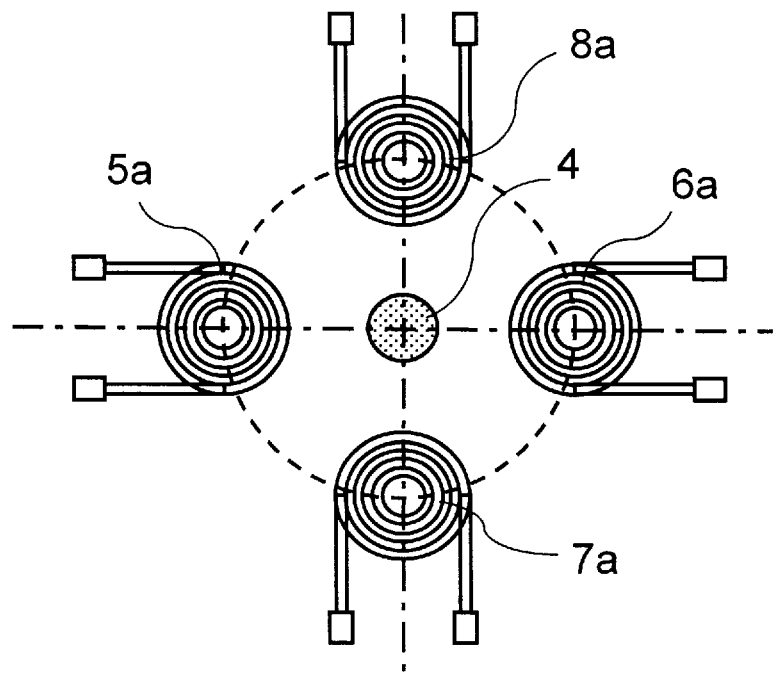
FIG. 3A is a plan view showing the positional relationship between a magnetic body and four coils for detecting acceleration in the first exemplary embodiment of the present invention.
Figure 3B:
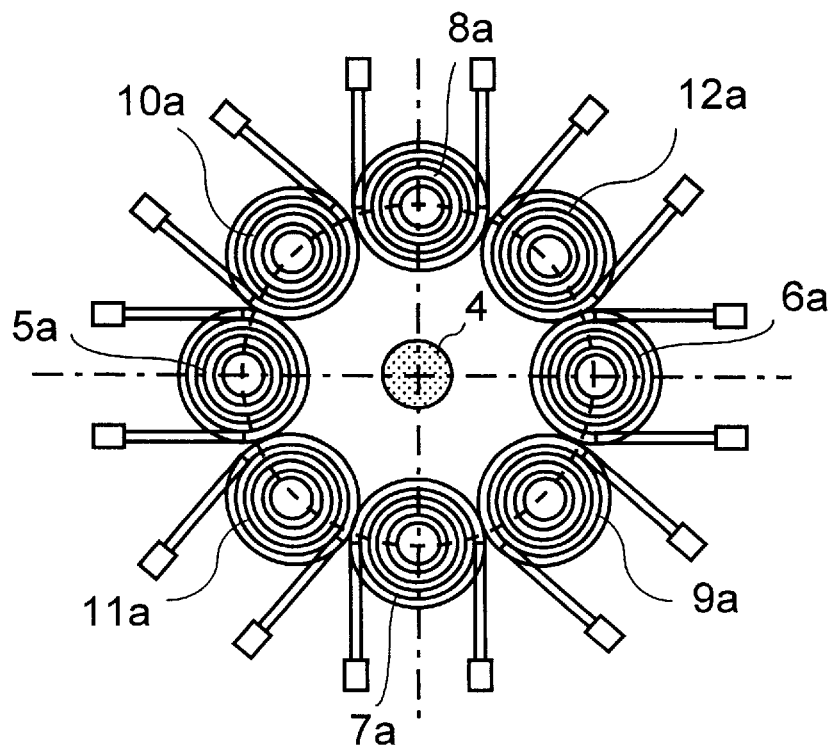
FIG. 3B is a plan view showing another arrangement according to the first exemplary embodiment of the present invention having eight coils for detecting acceleration.

FIGS. 3A and 3B are plan views showing a positional relationship between individual detector elements and the permanent magnet of the acceleration sensor. FIG. 3A shows an arrangement of the detector elements 5a to 8a which corresponds to the configuration of FIG. 1 and FIG. 2. FIG. 3B shows an example having eight detector elements. Additional detector elements 9a, 10a, 11a and 12a are included along with the four detector elements 5a to 8a which are located along the X-axis and the Y-axis, for a total of eight.

In FIG. 3B, a pair of the detector elements 9a and 10a are concentrically positioned in a manner such that their centers and the centers of detector elements 5a to 8a are disposed along the perimeter of a circle in the X-Y axis having origin 0 as its center. The center points of each detector elements 9a and 10a are disposed at an angle of 45° with respect to both of the X-axis and the Y-axis. The other pair of the detector elements 11a and 12a is also placed in the same relation as above.

As described, the detector elements need not be just four sets on the X-axis and the Y-axis, but they can be of any even number placed on the X-Y plane. Conditions for this arrangement are twofold. First, the pairing two detector elements (e.g. a pair of the detector elements 9a and 10a, or a pair of the detector elements 11a and 12a in FIG. 3B) are disposed so that their center points are located on the perimeter of a circle passing through the centers of the detector elements 5a to 8a in the X-Y plane and the pair is positioned symmetrically with respect to the origin point O. Second, the adjoining detector elements do not interfere electromagnetically with each other.

With the above configuration, if the acceleration sensor mounted on a robotic arm, for example, is displaced due to a rotation or other similar motion of the arm, the vibrator 2b unified with the permanent magnet 4, which constitutes a mass point, vibrates. The vibration may occur in a variety of modes depending on the direction of the displacement and the rate of change per unit time in magnitude of the displacement. For example, the vibrator 2b may make vibrate unidirectionally along the Z-axis shown in FIG. 1, or may deform repeatedly in a twisting motion.

Figure 4A:
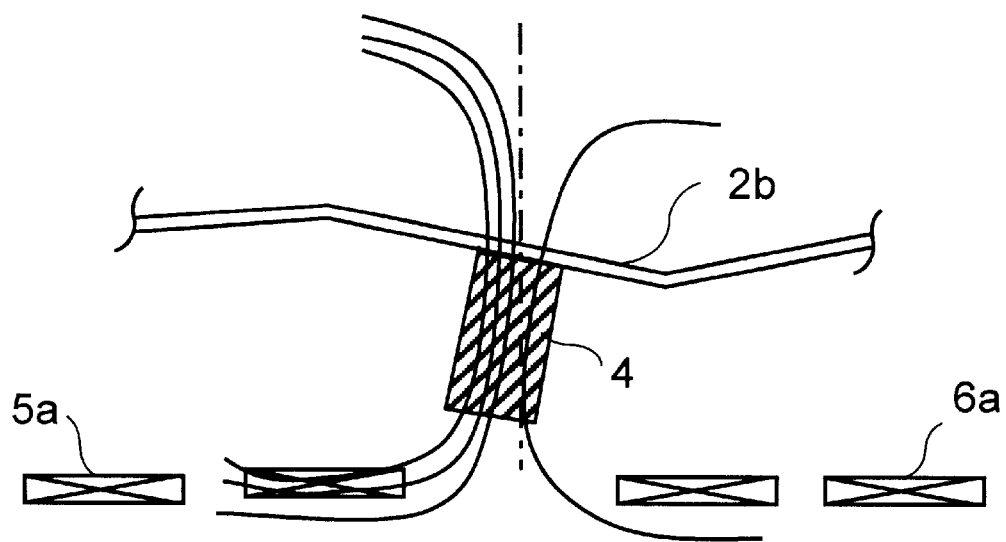
FIGS. 4A and 4B are schematic views showing variations of magnetic flux due to changes in orientation of the magnetic body with respect to the two coils positioned along the direction of X-axis according to the first exemplary embodiment of the present invention.
Figure 4B:
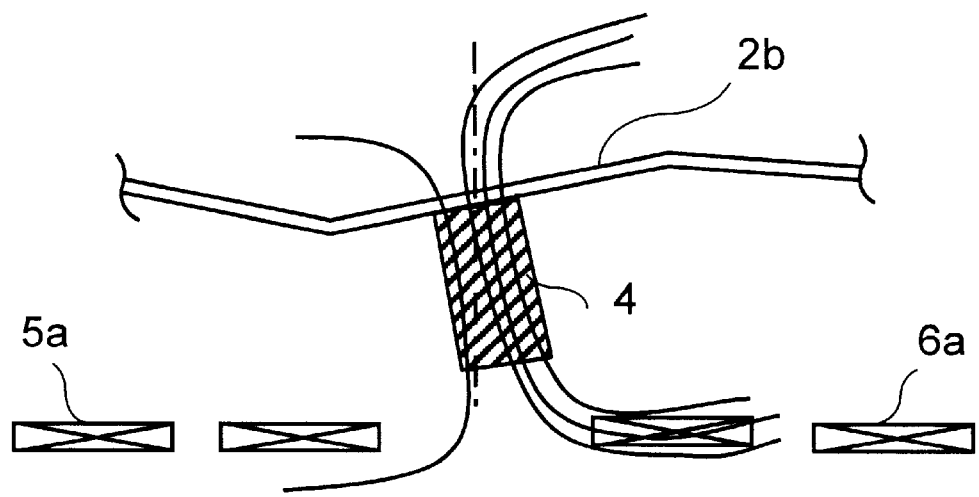

FIGS. 4A and 4B are schematic views showing an example of swaying variations of the vibrator 2b in the X-axis direction. The permanent magnet 4 tilts with its lower end leaning toward a side of the detector element 5a in FIG. 4A, and leaning toward a side of the detector element 6a in FIG. 4B. When the permanent magnet 4 fluctuates in the manner as shown, a relative position of the permanent magnet 4 changes with respect to the detector elements 5a and 6a. In the case where permanent magnet 4 leans toward a side of the detector element 5a from the center position, as in FIG. 4A, the magnetic flux interlinking the detector element 5a increases by a certain amount, whereas an approximately equal amount of the magnetic flux decreases at a side of the detector element 6a. In the case of FIG. 4B, similar changes of the magnetic flux also occur with the detector elements in the reversed positions.

As described above, a change in orientation of the permanent magnet 4 in the direction of X-axis creates changes in the interlinking magnetic flux to the two detector elements 5a and 6a by approximately the same amount in the reversed order. An output voltage of opposite polarity is induced in each of the detector elements 5a and 6a in proportion to a degree of change rate of the magnetic flux with respect to time. Therefore, if an output voltage induced in the detector element 5a is positive in response to the movement of the permanent magnet 4 leaning toward the detector element 5a, a negative output voltage in the same phase and the same magnitude is induced in the other detector element 6a. Hence, acceleration in vector of the permanent magnet 4 along the direction of X-axis can be known, if a magnitude of the relative difference (a differential output) between respective output voltages of the detector elements 5a and 6a is known. Use of the relative difference (a differential output) between output voltages of two coils of this kind also gives an advantage of improving a detecting accuracy of weak signals, since it can offset external noises of the same direction and the same phase generated across the coils.

Also, the same is true with the detector elements 7a and 8a on the Y-axis. Acceleration in vector of the permanent magnet 4 along the direction of the Y-axis can be determined by knowing a relative difference between output voltages of the detector elements 7a and 8a.

Since the detector elements 5a to 8a are all located with their respective centers along the perimeter of the concentric circle around the origin point O and with a center-to-center angle of 90° with respect to one another around the origin point O, acceleration in vector of the permanent magnet 4 in all directions on the X-Y plane can be known by combining the detected outputs of both directions of the X-axis and Y-axis.

Further, when the vibrator 2b deforms by flexing vertically, the permanent magnet 4 moves in the direction of Z-axis as in FIG. 1, so that the distance between the permanent magnet 4 and each of the detector elements 5a to 8a in the Z-axis direction changes. Therefore, when the permanent magnet 4 displaces along the direction of Z-axis, an output voltage of same magnitude is generated in each of the detector elements 5a to 8a, as the magnetic flux interlinking them changes according to the displacement in the Z-axis direction from the origin point O. Hence, acceleration in vector of the permanent magnet 4 in the Z-axis direction can be detected from a sum total of the output voltages of the detector elements 5a to 8a.

As has been described, a center of the vibrator 2b and an axis of the permanent magnet 4 are positioned in line with the Z-axis in the orthogonal spatial coordinates, and four detector elements 5a to 8a are positioned on the X-Y plane along the X-axis and the Y-axis and along the perimeter of a concentric circle formed around origin point O. In this way, acceleration in vector of the permanent magnet 4 can be obtained in any of the X-, Y- and Z-axes.

Since the permanent magnet 4 functions as a mass point which is fixed to the vibrator 2b and is capable of vibrating in three-dimensions, acceleration in vector of the spatial coordinate system affecting to the acceleration sensor itself can be calculated (and the calculation output) by knowing the acceleration in vector of the permanent magnet 4.

Also, as shown in FIG. 3B, the detection accuracy can be improved by adding values detected by the detector elements 9a and 12a placed along lines forming an angle of 45° with respect to each of the X-axis and the Y-axis, in addition to those of the four detector elements 5a to 8a on the X-axis and the Y-axis.

Second Exemplary Embodiment

Figure 5A:
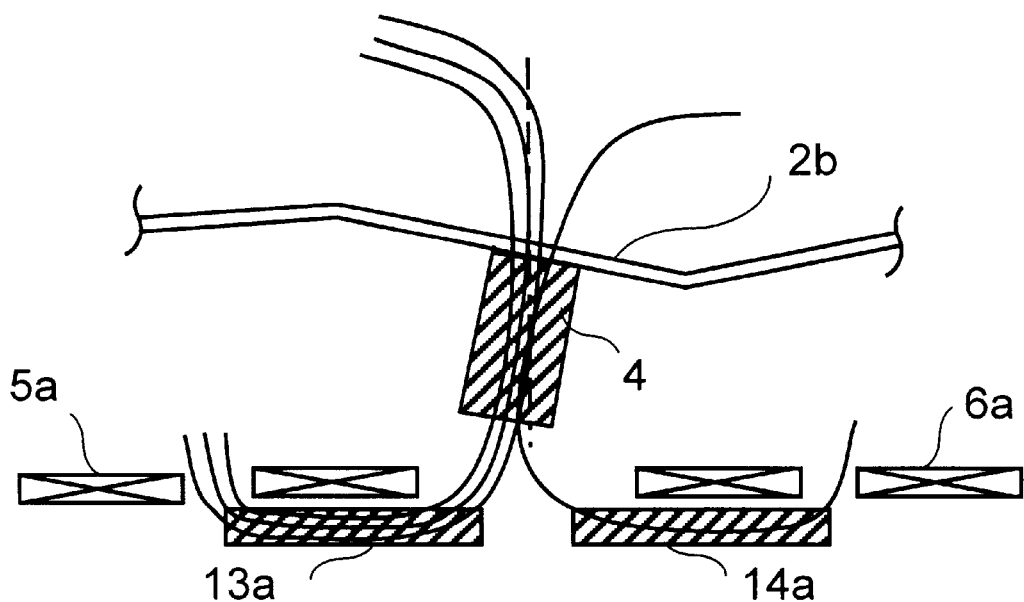
FIGS. 5A and 5B are schematic views showing variations of magnetic flux according to the second exemplary embodiment of the present invention, wherein lower magnetic layers are placed underneath the detection coils.
Figure 5B:
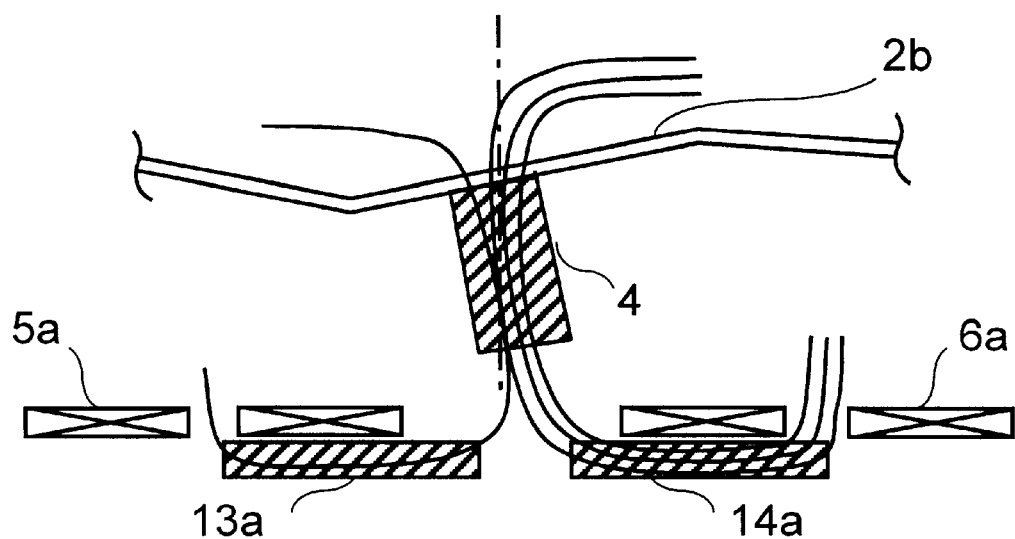

An acceleration sensor of a second exemplary embodiment of the present invention is described by referring to FIG. 5A and FIG. 5B.

FIGS. 5A and 5B show a structure that further improves detection efficiency of the acceleration in vector by the detector elements which are also coils in this embodiment. The detector elements 5a and 6a in the X-axis direction will be described as an example.

In FIGS. 5A and 5B, lower magnetic layers 13a and 14a for absorbing magnetic flux of the permanent magnet 4 are formed under the respective detector elements 5a and 6a with a clearance to the extent of avoiding a contact. These lower magnetic layers 13a and 14a are formed in layered films on the surface of the lower layer substrate 1 shown in FIG. 2. Lower magnetic layers 13a and 14a may be formed by a thin film deposition process utilizing a material of high magnetic permeability such as, for example, iron, nickel or a compound cobalt alloy. An electrically nonconductive layer of thin film is formed to isolate lower magnetic layers 13a and 14a from detector elements 5a and 6a.

The lower magnetic layers 13a and 14a are positioned at the side closer to the permanent magnet 4 with respect to each of the detector elements 5a and 6a, and they include a length that extends to the center area of the detector elements 5a and 6a. Lower magnetic layers are essentially planar structures and may be oval or rectangular in shape, with their longitudinal axes along the direction of X-axis, as in FIGS. 5A and 5B for example.

With lower magnetic layers 13a and 14a provided, magnetic flux of the permanent magnet 4 is deflected in a manner to be collected by these lower magnetic layers 13a and 14a instead of interlinking the detector elements 5a and 6a directly, thereby concentrating the magnetic flux into the center of the detector elements 5a and 6a. As a consequence, detection accuracy of acceleration in vector in the direction of X-axis of the permanent magnet 4 is improved, since the detecting efficiency of the magnetic flux is increased as compared with the magnetic flux pattern shown in FIGS. 4A and 4B corresponding to detector elements 5a and 6a provided without lower magnetic layers.

A detection accuracy of acceleration in vector in the direction of Y-axis of the permanent magnet 4 can be improved as well by providing lower magnetic layers corresponding to each of detector elements 7a and 8a on the Y-axis in a similar manner. Accordingly, the detection accuracy of acceleration by the acceleration sensor is substantially improved by providing the lower magnetic layers that collect and guide the magnet flux to interlink through the centers of the detector elements 5a to 8a.

Third Exemplary Embodiment

An acceleration sensor of a third exemplary embodiment of the present invention will be described by referring to FIGS. 6 to 9B and FIGS. 12A to 13. The present embodiment is an example wherein the detector element comprises a magnetoresistance element (hereinafter referred to as an MR element).

For reference purpose, the MR element and the magnetoresistance effect are briefly described first. The MR element may be called a magnetic flux responsive sensor, as it exhibits a change in resistance value in response to an intensity of the external magnetic field, irrespective of a polarity of the magnetic field being applied. It is known that, unlike the electromagnetic induction type sensor, the MR element is not dependent on a changing speed of the external magnetic field, and produces a high output corresponding only to an intensity of the magnetic flux, which is determined by the position of the magnetic body.

Figure 12A:
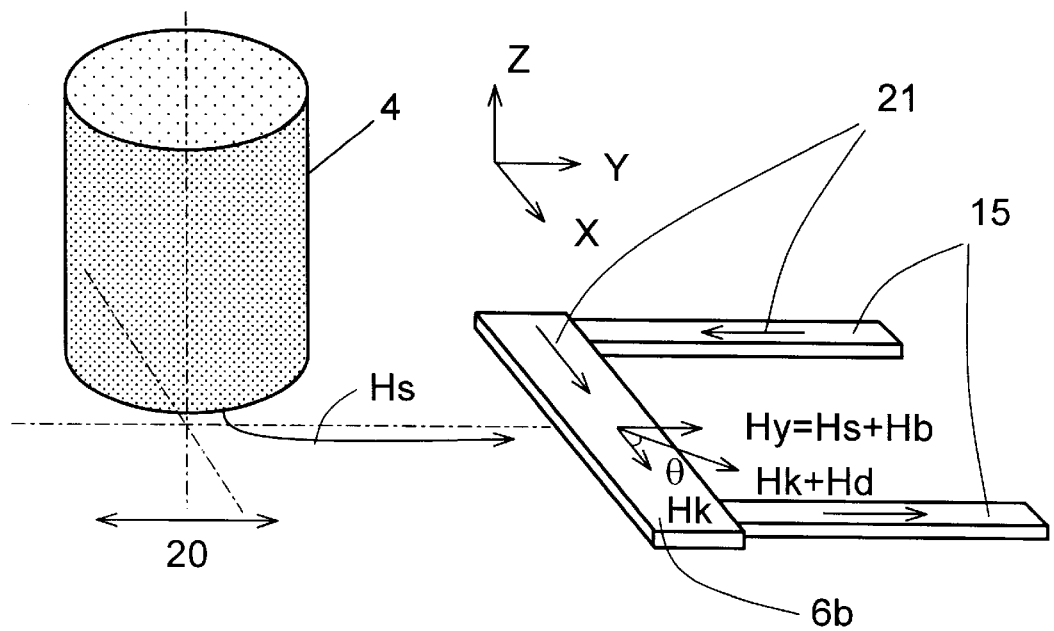
FIG. 12A is a schematic view showing a change in direction of magnetization within the MR element, when it receives an external magnetic field from a magnet.

Described hereinafter is an operating principle of the MR sensor. FIG. 12A shows an essential schematic view of a thin-film MR sensor. A detecting current 21 (Is) is directed in line with a direction of an axis of easy magnetization (direction of anisotropic magnetic field Hk) of the MR element which is formed of ferromagnetic thin film. Signal magnetic field (Hs) from magnet 4 is applied in a direction perpendicular to the detecting current (Is) within a plane of the MR element. The detecting current 21 (Is) is supplied from a pair of detecting terminals. A relationship between a change in specific resistance (Δρ) of the MR element and an output voltage (e) being detected is given by the formulas (1) and (2) below.

$$e = \Delta\rho \cdot j \cdot L \quad \text{formula (1)}$$

$$j = Is/(w \cdot t) \quad \text{formula (2)}$$

where:

e is an output voltage;

Δρ is a change in specific resistance;

j is a current density in the MR element;

Is is a detecting current in a direction of an axis of easy magnetization; and w, t, and L are width, thickness and length of the MR element.

Therefore, a greater magnitude of the output voltage is obtainable in the MR element, as the current density (j) and the change in specific resistance (Δρ) become larger, as is obvious from the formula (1).

The change in specific resistance (Δρ) is given by the formulas (3) and (4) below.

$$\Delta\rho = \Delta\rho\max \cdot \cos^2 \theta \quad \text{formula (3)}$$

$$\theta = \sin^{-1}\{(Hs+Hb)/(Hk+Hd)\} \quad \text{formula (4)}$$

where:

θ is an angle formed between a direction of an axis of easy magnetization (Hk) and a direction of magnetization (Hk+Hd);

Δρ max is a maximum value of the change in specific resistance;

Hs is an external signal magnetic field;

Hb is a biasing magnetic field (constant value); and

Hk is an anisotropic magnetic field in the MR element.

Figure 12B:
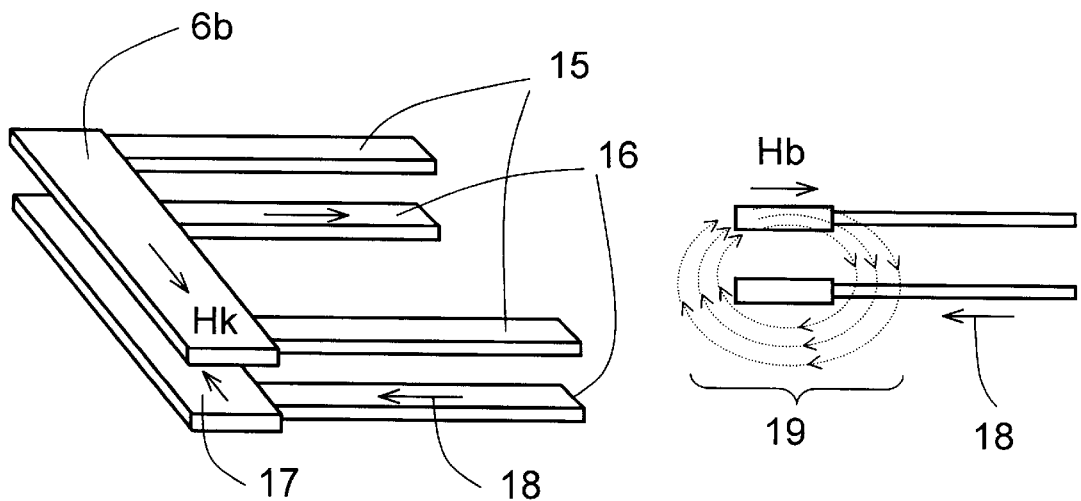
FIG. 12B is an illustrative drawing showing an example of positional arrangement of a bias electrode, and a representation of the pattern of the magnetic field charged by it.

Hd is an anti magnetic field;

An important parameter for the change in specific resistance (Δρ) that relates to an output voltage is the biasing magnetic field. Now referring to FIG. 12b, the biasing magnetic field (Hb) is a constant magnetic field 19 produced by a bias current through a bias element 17 positioned in close proximity to the MR element, the current flowing in a direction opposite to the anisotropic magnetic field of the MR element. The bias element 17 is supplied from a pair of bias terminals 16. FIG. 12A and 12B show that the detecting current 21 (Is) in the MR element and the anisotropic magnetic field Hk of the MR element in the X coordinate direction, and the biasing magnetic field (Hb) in the Y coordinate direction. The external signal magnetic field (Hs) is changing in the direction of an arrow 20.

Figure 13:
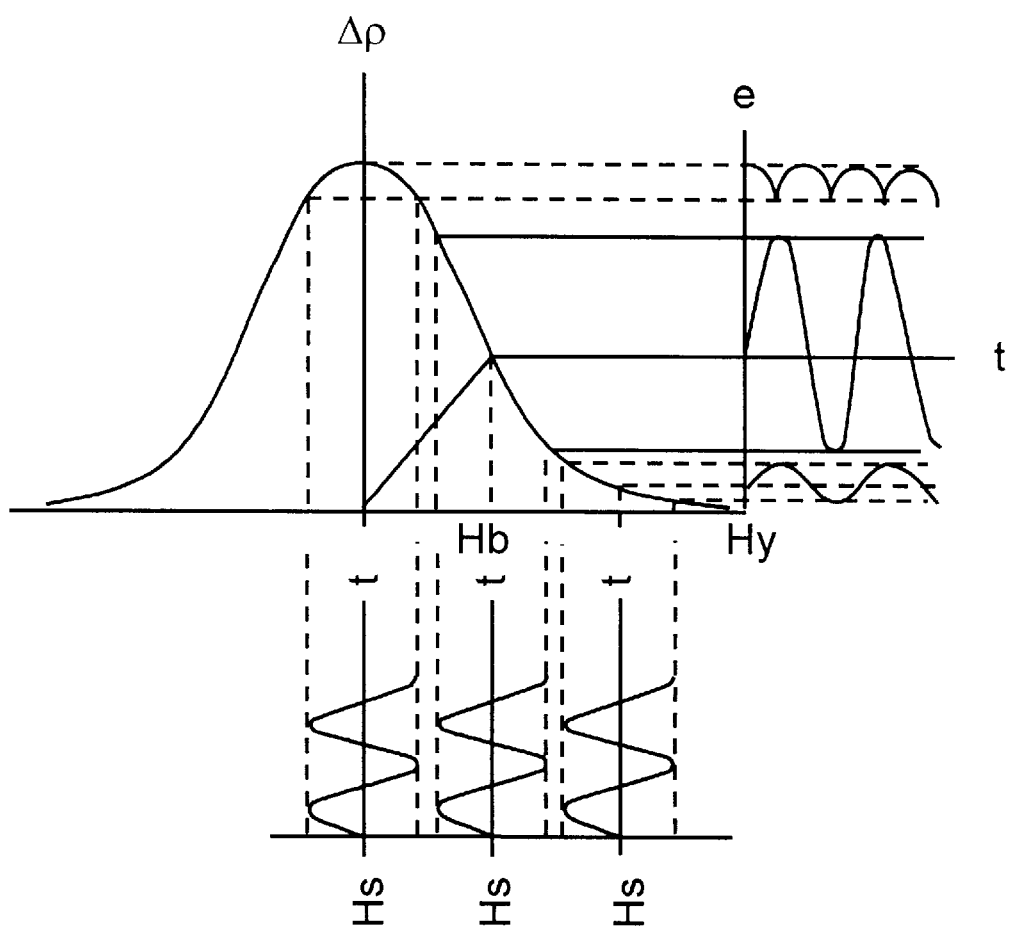
FIG. 13 is an illustrative graph showing a variation of specific resistance of the MR element and a relationship between output voltage and effective magnetic field.

FIG. 13 depicts a variation of the change in specific resistance Δρ (i.e. variation of an output) in relation to the effective magnetic field (Hy), which is (Hs+Hb). FIG. 13 shows that a magnitude of the biasing magnetic field (Hb), which provides a small wave distortion and good linearity and results in a maximum variation of Δρ by a change of the external signal magnetic field (Hs), is preferably the angle θ of about 45° when no external magnetic field is applied.

The third embodiment of the present embodiment substitutes the coils 5a to 12a, as used for the detector elements in FIG. 1 to FIG. 5B of the first exemplary embodiment, with the MR elements 5b to 12b as shown in FIG. 6 to FIG. 9B. The configuration of the MR detector elements are essentially identical to the embodiment utilizing the coils, and as described in conjunction with FIGS. 1–5B.

The present embodiment realizes an acceleration sensor of high sensitivity that is able to achieve a sufficient output voltage even if an external acceleration is extremely small and slow in movement by utilizing MR elements for the detector elements instead of coils.

Fourth exemplary embodiment

Figure 10A:
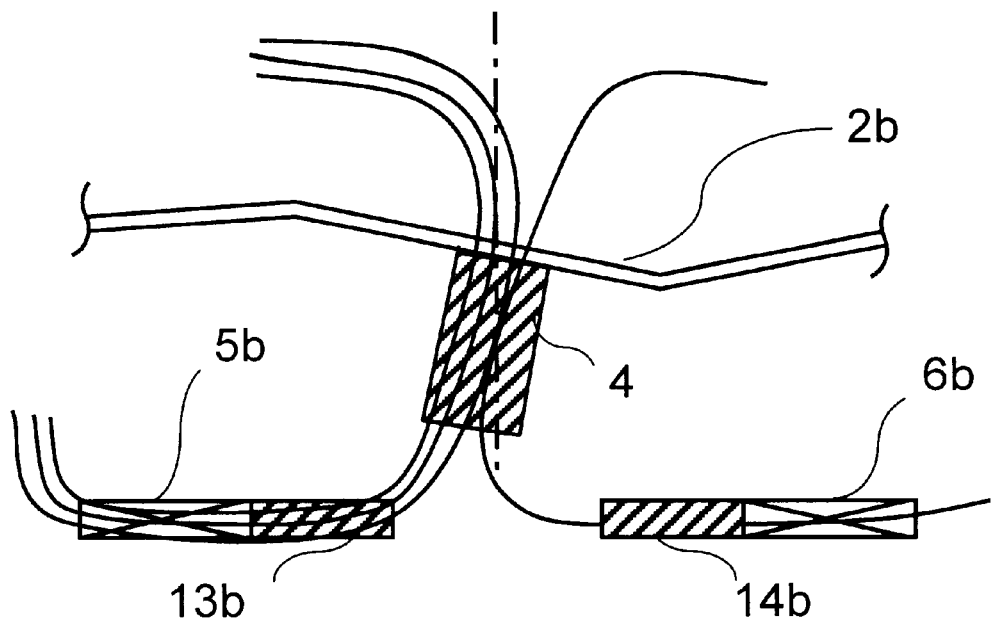
FIGS. 10A and 10B are schematic views showing variations of magnetic flux, when magnetic concentration layers are placed on a side of the MR elements facing toward the magnetic body according to the fourth exemplary embodiment of the present invention.
Figure 10B:
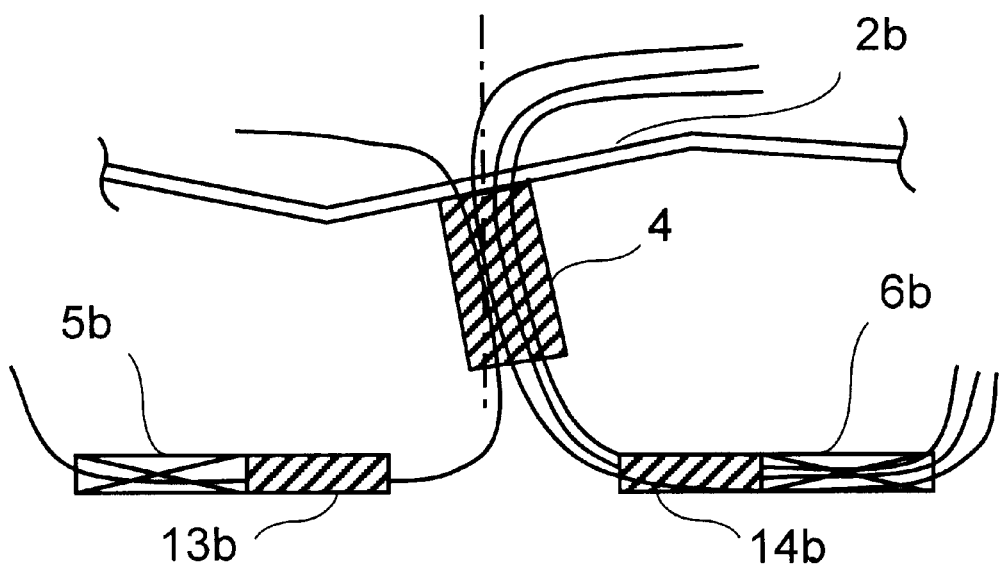

An acceleration sensor of a fourth exemplary embodiment of the present invention is described by referring to FIGS. 10A and 10B.

In FIGS. 10A and 10B, however, magnetic concentration layers 13b and 14b are placed in parallel along side surfaces of the MR elements 5b and 6b at the side of the MR element disposed toward the magnetic body with a clearance to the extent of avoiding contact. Magnetic concentration layers 13b and 14b absorb magnetic flux of the permanent magnet 4, as compared to the lower magnetic layers 13a and 14a of FIG. 5A and 5B. These magnetic concentration layers 13a and 14a can remarkably improve an efficiency of the MR elements in detecting the external magnetic flux. Output voltage of the MR element is determined by an absolute value of the magnetic flux that interlinks with it, whereas the output voltage of the coil is determined by the per-time-rate of change of the magnetic flux interlinking with it. Hence, an acceleration sensor of even higher sensitivity can be realized, since the MR element is able to achieve a sufficient output voltage, even if external acceleration is extremely small and slow in movement.

Fifth Exemplary Embodiment

Figure 11:
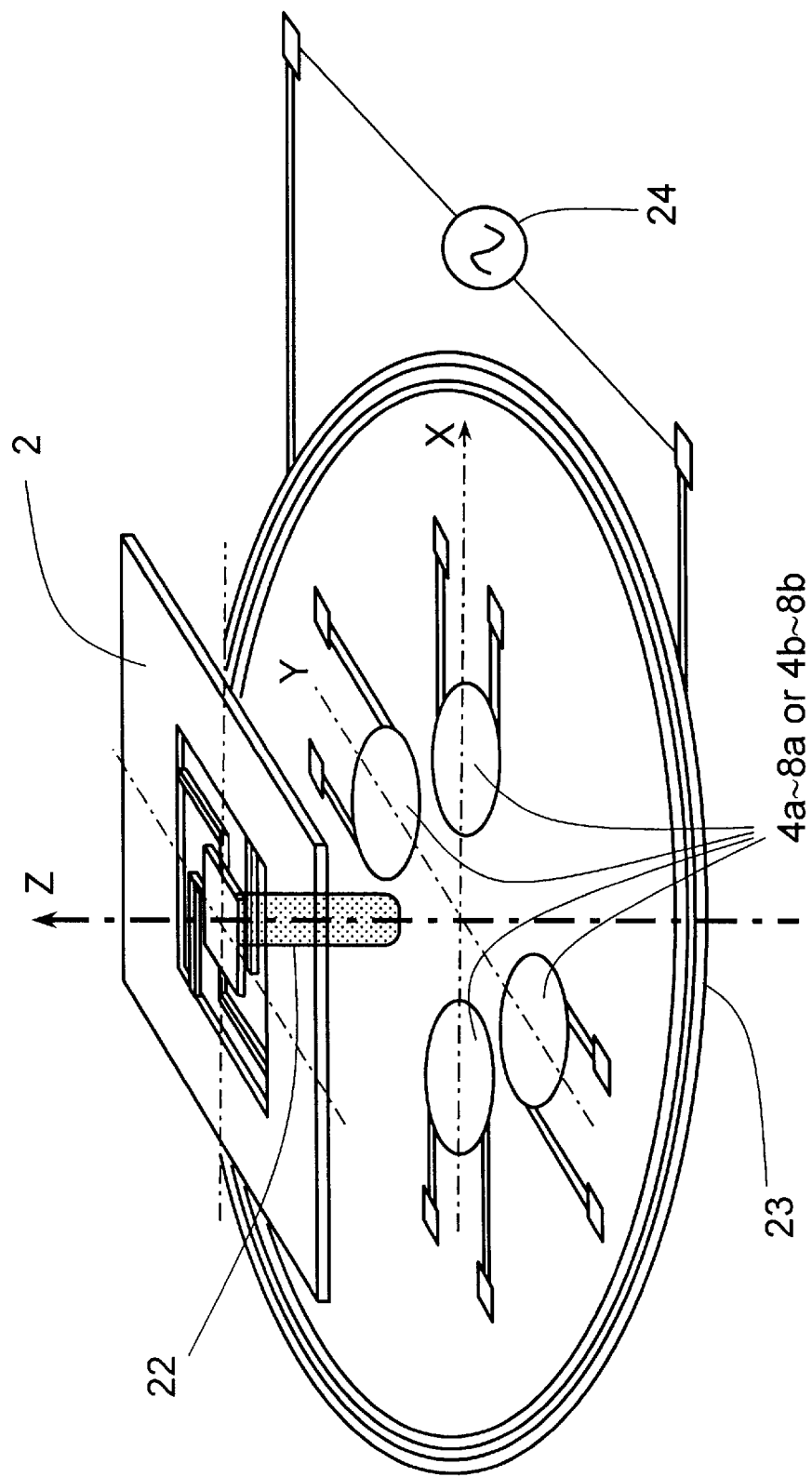
FIG. 11 is a schematic view of a fifth exemplary embodiment of the present invention, showing a structure in which the magnetic body depicted in FIG. 1

An acceleration sensor of a fifth exemplary embodiment of the present invention is described by referring to FIG. 11.

Figure 6:
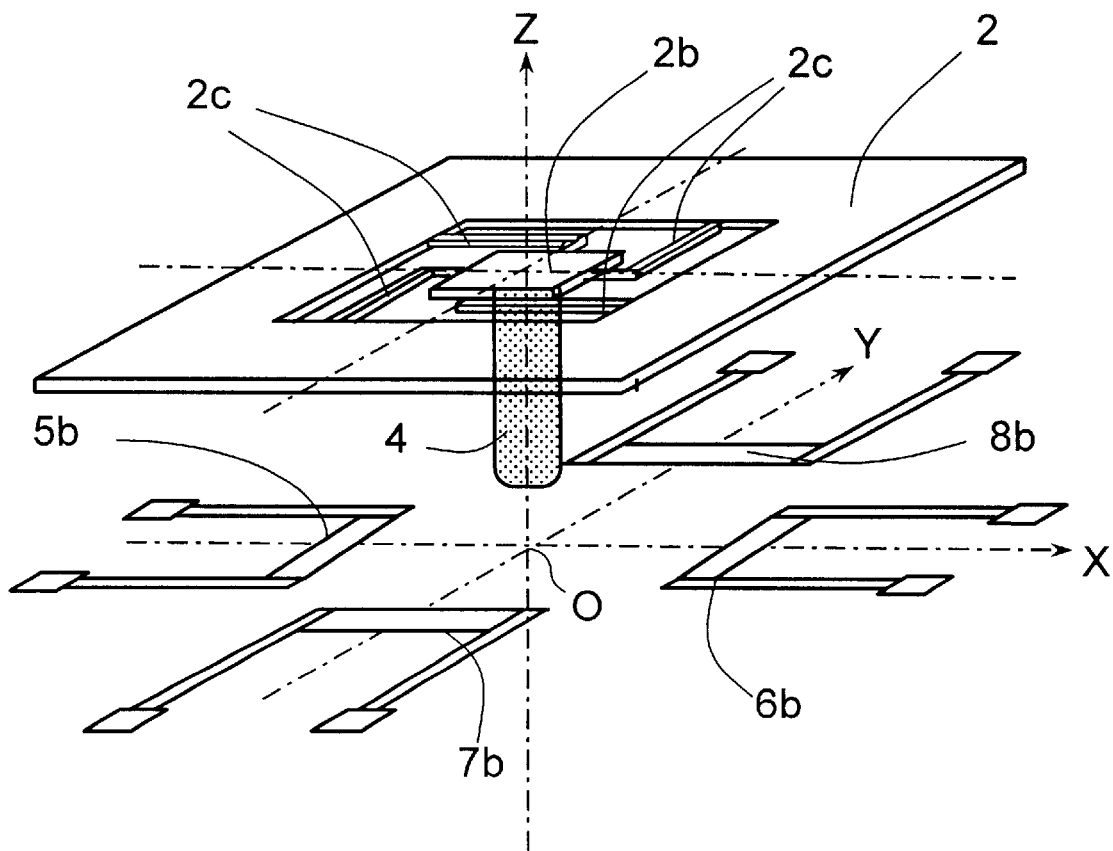
FIG. 6 is a schematic view showing a third exemplary embodiment of the acceleration sensor of the present invention, in which the detector elements comprise MR elements.
Figure 7:
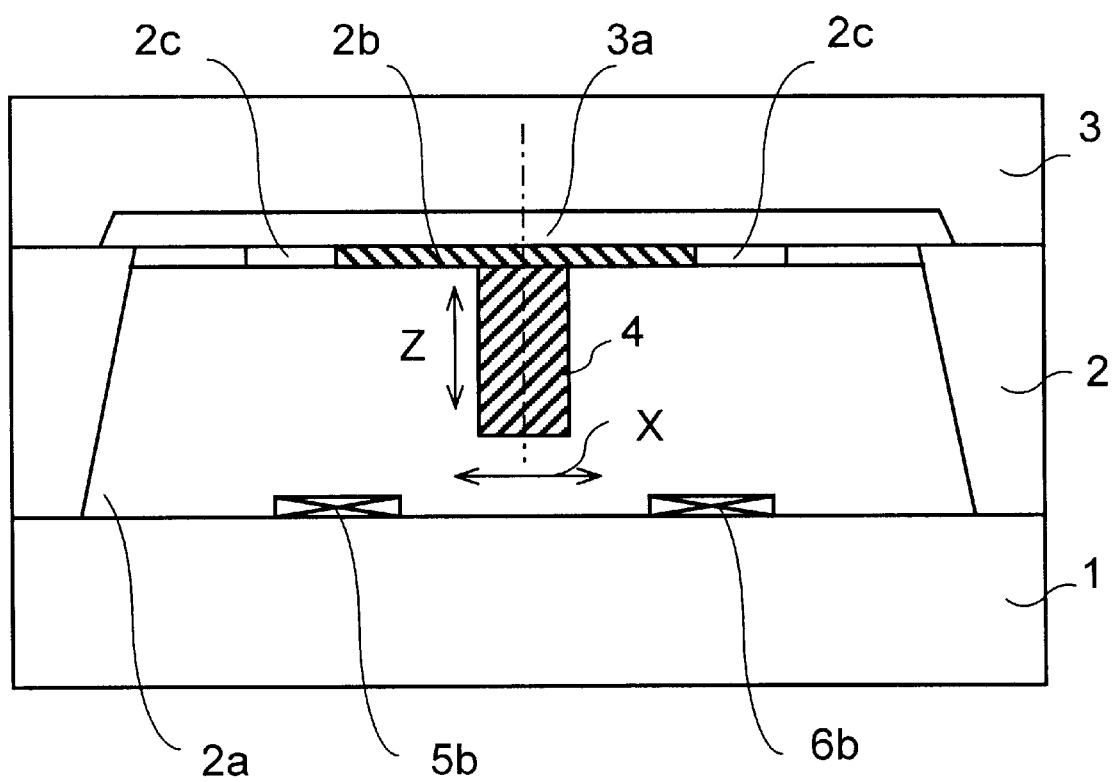
FIG. 7 is a longitudinal cross-sectional view showing the third exemplary embodiment of the acceleration sensor of the present invention.
Figure 8A:
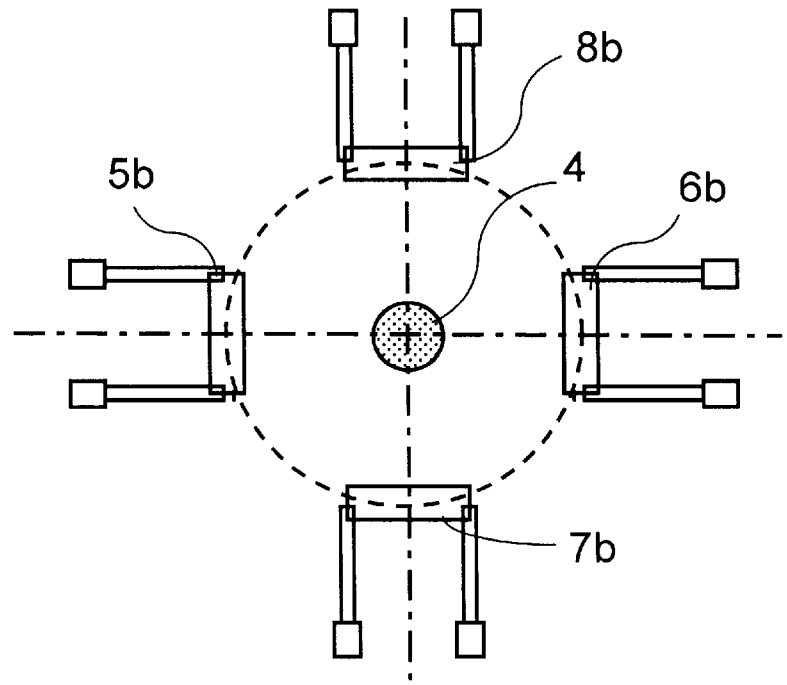
FIG. 8A is a plan view showing the positional relationship between a magnetic body and four MR elements for detecting acceleration according to the third exemplary embodiment of the present invention.
Figure 8B:
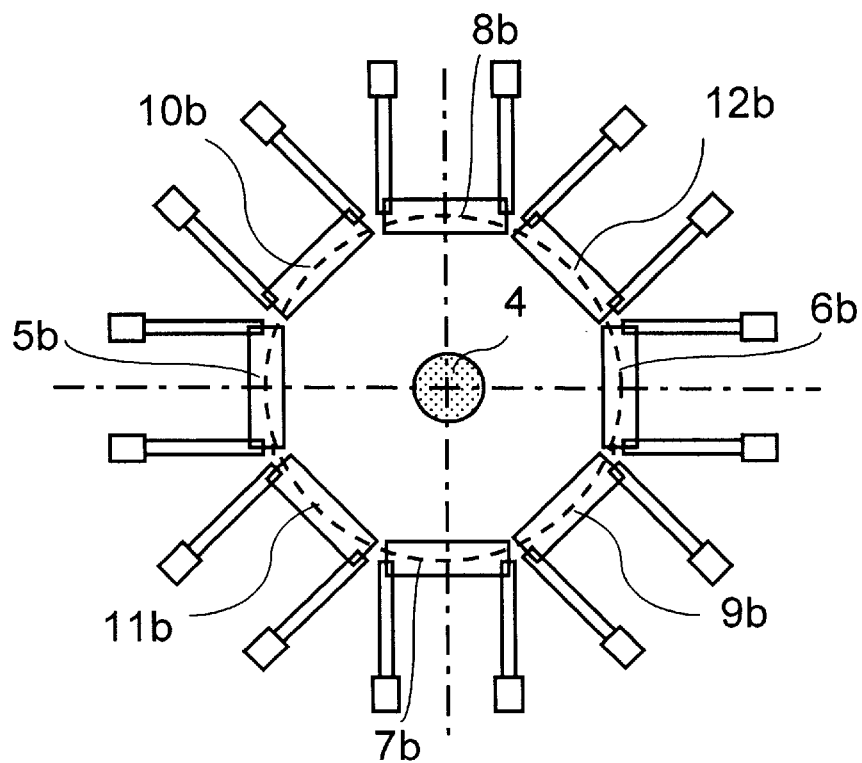
FIG. 8B is a plan view showing another arrangement of the third exemplary embodiment having eight MR elements.
Figure 9A:
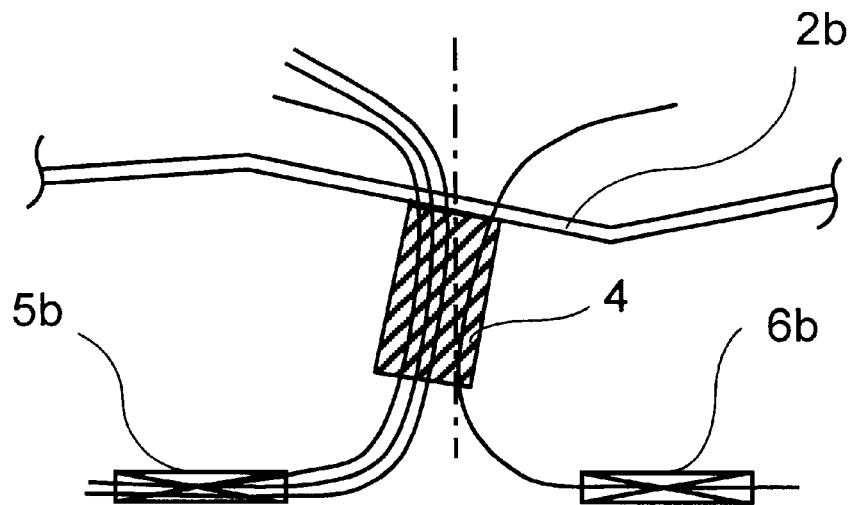
FIGS. 9A and 9B are schematic views showing variations of magnetic flux due to changes in orientation of the magnetic body with respect to the two MR elements positioned along the direction of X-axis in the third exemplary embodiment of the present invention.
Figure 9B:
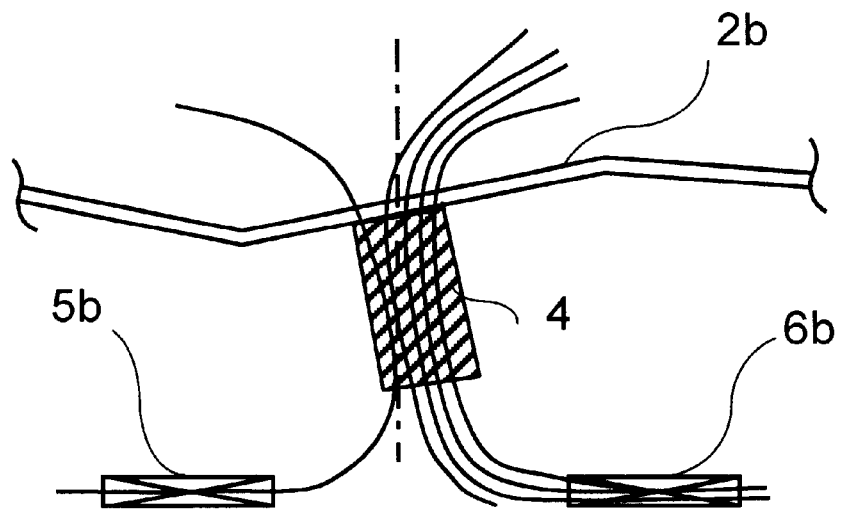

The present embodiment is an example in which the permanent magnet 4 in FIG. 1 or FIG. 6 is substituted with a magnetic body 22 of high permeability material, and an exciting coil 23 is wound around the detector elements (4a to 8a, shown in FIG. 1, or 4b to 8b, shown in FIG. 6). Alternating current 24 flows through exciting coil 23. In this structure, a generation source of the magnetic flux is the exciting coil 23. Since the magnetic flux is concentrated into the magnet body 22 of high permeability material situated in the center, it approximates the same magnetic circuit structure as the permanent magnet described previously. In this case, a signal obtained is a composite signal representing a basic signal produced by the alternating current 24 superimposed upon an output voltage of the acceleration signal. Therefore, this method is still able to obtain an acceleration signal through calculation of the signals derived from the individual detector elements.

As has been described in detail, the present invention provides an acceleration sensor having a wide dynamic range, which has been the principal feature of the electromagnetic induction type. The acceleration sensor of the present invention can detect a three-dimensional motion and a magnitude of displacement with high accuracy and high sensitivity, and is capable of being reduced in size with respect to conventional acceleration sensors.

Further detector elements may be added to the present invention to improve the detection accuracy.

Further, the invention utilizes MR elements for the detector elements, so as to realize an acceleration sensor of high sensitivity that is able to achieve a sufficient output voltage even if an external acceleration is extremely small and slow in movement.

Furthermore, the invention is able to further improve accuracy of the acceleration detection of the detector element by providing a lower magnetic layer or a magnetic concentration layer in the vicinity of the detector element for collecting the magnetic flux.

Because of the foregoing advantages, the three-dimensional acceleration sensor of the present invention provides good general versatility, and is adaptable to many applications ranging from positional detection of a minute displacement in a compact precision machine to positional detection of a large robotic hand, as examples.

What is claimed is:

1. An acceleration sensor comprising:
    a substrate;
    a vibrator connected to said substrate and having three-dimensional freedom;
    a magnetic body mounted on said vibrator; and
    at least four detector elements for detecting a variation of a magnetic field caused by a displacement of said magnetic body,
    wherein said acceleration sensor detects each of:
    acceleration in a direction of an X axis in the orthogonal spatial coordinate axes of X, Y and Z based on output signals of at least two of said detector elements due to variation of the magnetic field;
    acceleration in a direction of the Y-axis based on output signals of at least two other of said detector elements due to variation of the magnetic field; and
    acceleration in a direction of the Z-axis based on output signals of said at least four detector elements.

2. The acceleration sensor according to claim 1, wherein:
    said magnetic body includes a mass point and is mounted on said vibrator with an axis thereof in line with the Z-axis within the orthogonal spatial coordinate axes of X, Y and Z, said magnetic body being displaceable by an external acceleration;
    said at least four detector elements includes at least two detector elements positioned along the X-axis and at least two detector elements positioned along the Y-axis, each element having a center point located along a perimeter of a circle having as a center point, the origin point of said orthogonal spatial coordinate axes, and
    said acceleration sensor detects each of:
    acceleration in the direction of the X-axis through a relative difference in output voltage between said at least two detector elements positioned along the X-axis;
    acceleration in the direction of the Y-axis through a relative difference in output voltage between said at least two detector elements positioned along the Y-axis; and
    acceleration in the direction of the Z-axis through a sum total of the output voltages of said at least four detector elements.

3. The acceleration sensor according to claim 2, wherein said at least four detector elements further includes a plurality of pairs of detector elements, each pair arranged symmetrically with respect to the origin point of said orthogonal spatial coordinate axes in a manner such that adjoining detector elements do not interfere with each other,
    wherein, for each pair of detector elements, said acceleration sensor is capable of detecting acceleration along a direction defined by the origin point and center points of the pair of detector elements, through a relative difference in output voltage between said pair of detector elements, due to variation of the magnetic field.

4. The acceleration sensor according to claim 2, wherein said detector elements comprise coils.

5. The acceleration sensor according to claim 4, further comprising a lower magnetic layer disposed beneath each detector element for attracting and collecting magnetic flux of said magnetic body, and guiding said magnetic flux towards an approximate center of said detector element.

6. The acceleration sensor according to claim 2, wherein said detector elements comprise magnetoresistance effect type elements.

7. The acceleration sensor according to claim 6, further comprising, for each detector element, a magnetic concentration layer disposed adjacent a side of said detector element facing toward said magnetic body for attracting and collecting magnetic flux of said magnetic body, and guiding said magnetic flux toward an approximate center of said detector element.

8. The acceleration sensor according to claim 2, wherein said substrate further comprises:
    a lower layer substrate having said detector elements disposed at least indirectly on a surface thereof;
    an intermediate layer substrate disposed on said lower layer substrate and including a hollow space for containing said detector elements and a barrier plate functioning as said vibrator and positioned within an upper portion of said hollow space; and
    an upper layer substrate disposed on said intermediate layer substrate and having a recessed cavity confronting said vibrator,
    wherein each of said substrates, said detector elements, said magnetic body and said lower magnetic layer are formed by at least one of a semiconductor and a thin film manufacturing process.

9. The acceleration sensor according to claim 4, wherein said substrate further comprises:
    a lower layer substrate having said detector elements disposed on a surface thereof;
    an intermediate layer substrate disposed on said lower layer substrate and including a hollow space for containing said detector elements and a barrier plate functioning as said vibrator and positioned within an upper portion of said hollow space; and
    an upper layer substrate disposed on said intermediate layer substrate and having a recessed cavity confronting said vibrator,
    wherein each of said substrates, said detector elements, and said magnetic body are formed by at least one of a semiconductor and a thin film manufacturing process.

10. The acceleration sensor according to claim 6, further comprising:
    a lower layer substrate having said detector elements disposed on a surface thereof;
    an intermediate layer substrate disposed on said lower layer substrate and including a hollow space for containing said detector elements and a barrier plate functioning as said vibrator and positioned within an upper portion of said hollow space; and an upper layer substrate disposed on said intermediate layer substrate and having a recessed cavity confronting said vibrator, wherein each of said substrates, said detector elements, and said magnetic body are formed by at least one of a semiconductor and a thin film manufacturing process.

11. The acceleration sensor according to claim 2, further comprising:

an exciting coil disposed peripherally about said at least four detector elements.

12. The acceleration sensor according to claim 4, further comprising:

an exciting coil disposed peripherally about said at least four detector elements.

13. The acceleration sensor according to claim 6, further comprising:

an exciting coil disposed peripherally about said at least four detector elements.

14. The acceleration sensor according to claim 8, further comprising:

an exciting coil disposed peripherally about said at least four detector elements.

* * * * *

UNITED STATES PATENT AND TRADEMARK OFFICE
CERTIFICATE OF CORRECTION

| | |
|---|---|
| PATENT NO. : 6,131,457 | Page 1 of 1 |
| DATED : October 17, 2000 | |
| INVENTOR(S) : Sato | |

It is certified that error appears in the above-identified patent and that said Letters Patent is hereby corrected as shown below:

<u>Title page,</u>
Item [30] Foreign Application Priority Data, insert
-- April 6, 1998   [JP] Japan.......................10-93123 --.

Signed and Sealed this

Fourth Day of December, 2001

*Attest:*

*Attesting Officer*

NICHOLAS P. GODICI
*Acting Director of the United States Patent and Trademark Office*